United States Patent
Bostick et al.

(10) Patent No.: US 10,958,742 B2
(45) Date of Patent: Mar. 23, 2021

(54) COGNITIVE CONTENT FILTERING

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1063 days.

(21) Appl. No.: 15/434,417

(22) Filed: Feb. 16, 2017

(65) Prior Publication Data
US 2018/0232641 A1  Aug. 16, 2018

(51) Int. Cl.
*G06N 5/04* (2006.01)
*H04L 29/08* (2006.01)
(Continued)

(52) U.S. Cl.
CPC .............. *H04L 67/22* (2013.01); *G06N 5/04* (2013.01); *G06Q 10/0635* (2013.01);
(Continued)

(58) Field of Classification Search
CPC ... H04L 67/22; H04L 67/2823; H04L 67/306; G06N 5/04; G06Q 10/0635; G06Q 10/0639; G06Q 10/10; G06Q 50/01
See application file for complete search history.

(56) References Cited

U.S. PATENT DOCUMENTS

| 9,448,685 | B1* | 9/2016 | Somin | G06F 3/0481 |
| 9,712,587 | B1* | 7/2017 | Alfishawi | G06Q 30/0269 |

(Continued)

FOREIGN PATENT DOCUMENTS

| CN | 101292262 A | 10/2008 |
| CN | 103577505 A | 2/2014 |

(Continued)

OTHER PUBLICATIONS

Vivion, Nick, "Know ye genotype: How to predict future behavior from past social media use" [retrieved on Nov. 17, 2016]. Retrieved from the Internet< URL: https://www.tnooz.com/article/know-ye-genotype-how-to-predict-future-behavior-from-past-social-media-use/>, 2013, 3 pgs.

(Continued)

*Primary Examiner* — Kamran Afshar
*Assistant Examiner* — Ying Yu Chen
(74) *Attorney, Agent, or Firm* — James Nock, Esq.; Hye Jin Lucy Song, Esq.; Heslin Rothenberg Farley & Mesiti, P.C.

(57) ABSTRACT

Methods, computer program products, and systems are presented. The methods include, for instance: predicting a reaction by a user that may be caused from receiving social media content. An activity that may be affected by the predicted reaction is consequently predicted. A measure of impact by the social media content on the user performing the activity as predicted is quantified as a performance impact score based on numerous factors including the activity and the reaction predicted. If the performance impact score is within a certain range of threshold, the social media content would be delivered according to a delivery regime associated with the range.

20 Claims, 6 Drawing Sheets

(51) Int. Cl.
*G06Q 10/10* (2012.01)
*G06Q 10/06* (2012.01)
*G06Q 50/00* (2012.01)

(52) U.S. Cl.
CPC ......... *G06Q 10/0639* (2013.01); *G06Q 10/10* (2013.01); *G06Q 50/01* (2013.01); *H04L 67/2823* (2013.01); *H04L 67/306* (2013.01)

(56) References Cited

U.S. PATENT DOCUMENTS

| | | | | |
|---|---|---|---|---|
| 9,978,426 | B2* | 5/2018 | Smith | G11B 27/15 |
| 10,503,805 | B2* | 12/2019 | Lawbaugh | G06F 16/958 |
| 2009/0161949 | A1 | 6/2009 | Milov | |
| 2012/0124122 | A1 | 5/2012 | el Kaliouby et al. | |
| 2013/0097176 | A1* | 4/2013 | Khader | G06Q 30/0251 707/748 |
| 2013/0262365 | A1* | 10/2013 | Dolbear | G06N 5/02 706/47 |
| 2013/0283162 | A1* | 10/2013 | Aronsson | G11B 27/105 715/719 |
| 2014/0324749 | A1 | 10/2014 | Peters et al. | |
| 2015/0025917 | A1* | 1/2015 | Stempora | G06Q 40/08 705/4 |
| 2015/0067061 | A1 | 3/2015 | Poston | |
| 2015/0332603 | A1 | 11/2015 | Aravkin et al. | |
| 2016/0063874 | A1 | 3/2016 | Czerwinski et al. | |
| 2018/0330249 | A1* | 11/2018 | Hajiyev | G06Q 30/0242 |

FOREIGN PATENT DOCUMENTS

| | | |
|---|---|---|
| CN | 104156436 A | 11/2014 |
| WO | WO 2007055614 A1 | 5/2007 |
| WO | 2015164951 A1 | 11/2015 |

OTHER PUBLICATIONS

Press Trust of India, "Driving while angry or sad increases crash risk by 10 times" [retrieved on Nov. 17, 2016]. Retrieved from the Internet< URL: http://www.business-standard.com/article/pti-stories/driving-while-angry-or-sad-increases-crash-risk-by-10-times-116022800321_1.html >, Business Standard, Feb. 28, 2016, 1 pg.
Talbot, David. "Wrist Sensor Tells You How Stressed Out You Are" [retrieved on Nov. 17, 2016]. Retrieved from the Internet: < URL:https://www.technologyreview.com/s/508716/wrist-sensor-tells-you-how-stressed-out-you-are/ >, Dec. 20, 2012, 8 pgs.
Mell, Peter, et al., "The NIST Definition of Cloud Computing", NIST Special Publication 800-145, Sep. 2011, Gaithersburg, MD, 7 pgs.
International Search Report for International Patent Application No. PCT/IB2017/058209 filed Dec. 20, 2017, dated Apr. 23, 2018.
Written Opinion of the International Searching Authority for International Patent Application No. PCT/IB2017/058209 filed Dec. 20, 2017, dated Apr. 23, 2018.

* cited by examiner

COGNITIVE CONTENT FILTERING

TECHNICAL FIELD

The present disclosure relates to delivery of personal messages and social media content, and more particularly to methods, computer program products, and systems for cognitive filtering of certain social media contents in order to prevent negative impact on the performance of user activity.

BACKGROUND

In modern mobile telecommunication environment with prolific telecommunication networks with wide range of membership and activities, users almost always have access to mobile devices and receive social media contents. Because users may have strong emotional reactions to some social media contents, such ubiquitous accesses to mobile devices and instant delivery of social media content at all times may not be desirable when a user is engaged in activities with significant consequences if the performance is impaired.

SUMMARY

The shortcomings of the prior art are overcome, and additional advantages are provided, through the provision, in one aspect, of a method. The method for cognitively filtering social media content to a user includes, for example: predicting, by one or more processor, a reaction of the user that may be caused by the social media content; predicting an activity of the user that may be affected by the predicted reaction; calculating a performance impact score for the user, the performance impact score indicating a measure of impact by the social media content on the user performing the predicted activity; filtering the social media content, upon determining that the calculated performance impact score is within a range for filtering; and delivering the social media content according to a delivery regime associated with the range. Advantages of the method may be, but are not limited to, contributing to user safety and other benefits by preventing performance impact that may be caused by the social media content delivered without filtering as presented in this specification.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
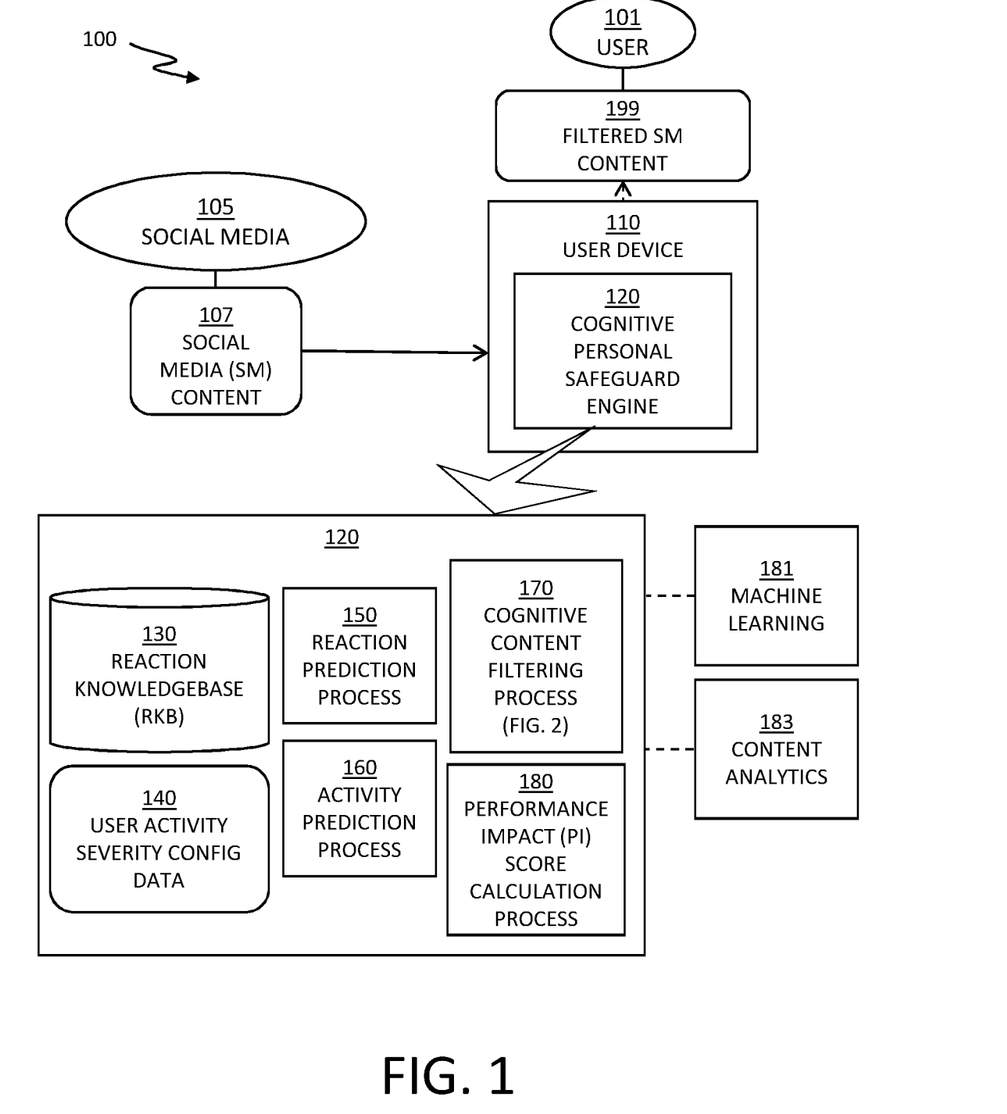
FIG. 1 depicts a system for assuring user safety in content delivery, in accordance with one or more embodiments set forth herein.

FIG. 1 depicts a system 100 for assuring user safety in content delivery, in accordance with one or more embodiments set forth herein.

The system 100 providing a safe content delivery includes a user 101, a user device 110, and a social media 105 to which the user 101 subscribes. Examples of the user device 110 may be any type of mobile and/or wearable personal device on the user 101, having various sensors, data capturing, processing and communicating functionalities.

The social media 105 transmits social media (SM) content 107 to the user device 110 as agreed between the social media 105 and the user 101. The SM content 107 may include, but not limited to, postings on social media sites to which the user 101 subscribes, follow up notifications of such postings in which the user is interested, email and/or any other message delivered to the user 101, etc., having wide range of information including travel photos, political views, personal information, etc.

A cognitive personal safeguard engine 120 running on the user device 110 intercepts the SM content 107 for filtering of any SM content 107 for user safety prior to delivering the SM content 107. Conventionally, the SM content 107 is instantaneously displayed on the user device 110 by use of a user program such as a mobile app of the social media 105 once the SM content 107 is received on the user device 110, to which the user 101 emotionally and/or behaviorally responds. Such reactions to the SM content 107 may be unsafe for the user 101, depending on numerous factors such as the kind of activity the user 101 is engaged at the moment, a reaction of the user 101, the message of the SM content 107, etc. The cognitive personal safeguard engine 120 assures that the user 101 receives the SM content 107 in a safe manner customized for the user 101 by delivering a filtered SM content 199. The user 101 may not have a predicted reaction to the filtered SM content 199 unlike to the SM content 107, which are predicted to be unsafe to the user 101. The filtered SM content 199 may be selected from a notification of the SM content 107 without the SM content 107, a notification of the SM content 107 to be delivered by a certain delivery schedule based on the user activities, a delayed delivery of the SM content 107 without notification, and combinations thereof. The cognitive personal safeguard engine 120 determines the SM content 107 as unsafe to deliver to the user 101 based on a likely activity performed by the user 101 on and/or after the prospected time of delivery, a likely reaction to the SM content 107 by the user 101, the intensity of reaction to the SM content 107 by the user 101, as well as a preconfigured threshold for the impact of the SM content 107 on the user 101 in performing the likely activity. Whether or not to filter the SM content 107 and how long the SM content 107 to be delayed if filtered may be configured manually by the user 101 or automatically by the cognitive personal safeguard engine 120. For example, the user 101 may configure the cognitive personal safeguard engine 120 to delay all filtered SM contents until ten o'clock at night, when the user 101 is safely at home. In certain embodiments of the present invention, the cognitive personal safeguard engine 120 may be implemented on a delivery infrastructure of the social media 105 such that the SM content 107 may not proceed to the user device 110 if filtered as presented herein. In certain embodiments of the present invention, the cognitive personal safeguard engine 120 may be offered as a subscribed service for multiple social networks such that more sophisticated filtering service would be available to users.

The cognitive personal safeguard engine 120 includes a reaction knowledgebase (RKB) 130, user activity severity configuration data 140, a reaction prediction process 150, an activity prediction process 160, a cognitive content filtering process 170, and a performance impact (PI) score calculation process 180. The cognitive personal safeguard engine 120 may use external cloud-based services including a machine learning service 181, and a content analytics service 183. External services 181, 183 are coupled over a network connection, as presented in respective dashed lines.

The reaction knowledgebase (RKB) 130 stores past SM contents and reactions by the user 101 corresponding to each past SM content. The reactions may be classified in a few groups based on levels of respective emotional intensities associated with reactions by the user 101 corresponding to respective contents, and a duration and/or type of the reactions, etc. For example, if the user 101 had been responding neutrally to weather and local newsfeeds in the past, then the weather and local newsfeeds may be classified as corresponding to a neutral reaction, and accordingly the SM content having weather and local news may be delivered without filtering. For another example, if the user 101 had been very agitated by postings on a specific blog and actively responded to the postings by commenting numerous times, then SM content from the specific blog may be classified as corresponding to an intense reaction, which may be a safety concern for the user 101. For still another example, any SM content that may make the user angry or sad, based on the reactions by the user 101 as observed over time, are classified as corresponding to an enduring, negative, and intense reaction. For still another example, SM contents having funny video clip may be classified as corresponding to a short, positive, and intense reaction as the user 101 may be distracted by watching the video clip and by laughing. Emotional intensities associated with reactions may be analyzed and determined by use of known content analytics tools, and will not be presented in this specification.

In building the RKB 130, the reactions corresponding to the SM contents may be measured by various spoken and/or textual expression as well as by use of body monitoring data such as, but not limited to, biometric and physiological data of the user 101, such as a heart rate, a blood pressure, body temperature, and perspiration, etc. Wherein speech monitoring is available by microphone on the user device 110 and by natural language processing by way of external services such as the machine learning service 181 and the content analytics service 183, voice stress level data and/or types of words and phrases used by the user 101, etc., may be taken into account in classifying the reactions. Wherein video monitoring is applicable, body language and gestures, facial expression, eye dilation, environments of the user 101, etc., may also be taken into account in determining the emotional intensity in reactions by the user 101, by use of embedded and/or external analytics service. The reaction prediction process 150 predicts a likely reaction of the user 101 to the SM content 107 by comparing the SM content 107 and SM contents with known user reactions of a similar pattern, as stored in the RKB 130.

The user activity severity configuration data 140 represent a level of risk to the user 101 if a corresponding activity is not properly performed. The user activity severity may include the factors of, but are not limited to, how severe the safety risk might be if the performance of the user 101 would have been impaired during a certain activity, how susceptible the user 101 may be to emotional reactions for the same certain activity, and how imperative it is that the user 101 performed to the best of ability such as business meetings, exams, etc. For example, an activity of driving may be more severe to a new driver than to an experienced driver, because the new driver would lose control more easily than the experienced driver due to lack of driving experience, defensive driving tactics, skill level necessary to understand the road condition and other drivers, etc. Also, for every user, an activity of driving may be more severe than an activity of resting at home, because driving has more safety implications and susceptible to error far more than resting at home. Also, any activity of significant consequence that should be protected from impairment caused by the SM content 107 may be classified as severe, regardless of safety implications, such as business meeting with a major client, etc.

The activity prediction process 160 predicts a likely activity in which the user 101 might be engaged at the time of receiving the SM content 107 if not filtered. The likely activity may further implicate any activity performed by the user 101 that may be affected by the SM content 107, not only at the time of delivery but afterward as well. The likely activity of the user 101 that may be affected by the SM content 107 may be determined based on information such as, but not limited to, a duration of a present activity that the user 101 is performing, a duration of the reaction on the SM content 107, speech of the user 101, a calendar and/or scheduled events for the user 101, daily routine as shown in activities repeated over time according to a certain timeframe for the user 101 like morning/evening commutes, work hours, game nights, social media contribution/participation, etc.

The cognitive content filtering process 170 indicates an overall coordinated process of the reaction prediction process 150, the activity prediction process 160, and the performance impact (PI) score calculation process 180 in order to successfully filter the SM content 107 that may cause a performance impact greater than a preconfigured threshold on the user 101 by the SM content 107 while performing the likely activity. Detailed operations of the cognitive content filtering process 170 are presented in FIG. 2 and corresponding description. In certain embodiments of the present invention, the reaction prediction process 150 and the activity prediction process 160 may be performed concurrently, prior to perform the PI score calculation process 180.

In certain embodiments of the present invention, the cognitive content filtering process 170 predicts reactions and/or monitors real-time state data of the user 101 that represents actual reactions by the user 101 in real time such that the filtering of certain SM content may be more appropriate based on various activities and/or contents. For example, if the user 101 performs activity A the first time, the cognitive content filtering process 170 predicted a first reaction as being caused by a content type of incoming SM content, but delivers the SM content without filtering as there is no content-reaction mapping pattern to rely on. Next time the cognitive content filtering process 170 receives another SM content having the same content type for the user 101, who performs the same activity A, the cognitive content filtering process 170 may filter the content and monitor the reaction on the user 101 in order to ascertain the effect of filtering on the user 101. Various ways used in measuring user reactions for building the RKB 130 may also be utilized in measuring real time feedback of user reactions. For another example, wherein the cognitive content filtering process 170 could not properly analyze the SM content due to ambiguous expressions, and consequently the SM content is not properly classified by the content, the cognitive content filtering process 130 may still properly establish the reaction pattern for the SM content in the RKB 130 based on the real time measurement of the user reaction.

The performance impact (PI) score calculation process 180 represents a process quantifying the effect of the SM content 107 on the user 101 while performing the likely activity predicted by the activity prediction process 160. Public safety studies suggest that angry, sad, or otherwise emotionally agitated drivers may be ten times more likely to be in a severe car accident than average drivers. Accordingly, emotional state of the user 101 as predicted by the likely reaction may reasonably impact performance of the likely activity, and the PI score calculation process 180 quantifies the degree of impact on the performance. Details of the PI score calculation process 180 are presented in FIG. 3 and corresponding description.

Figure 2:
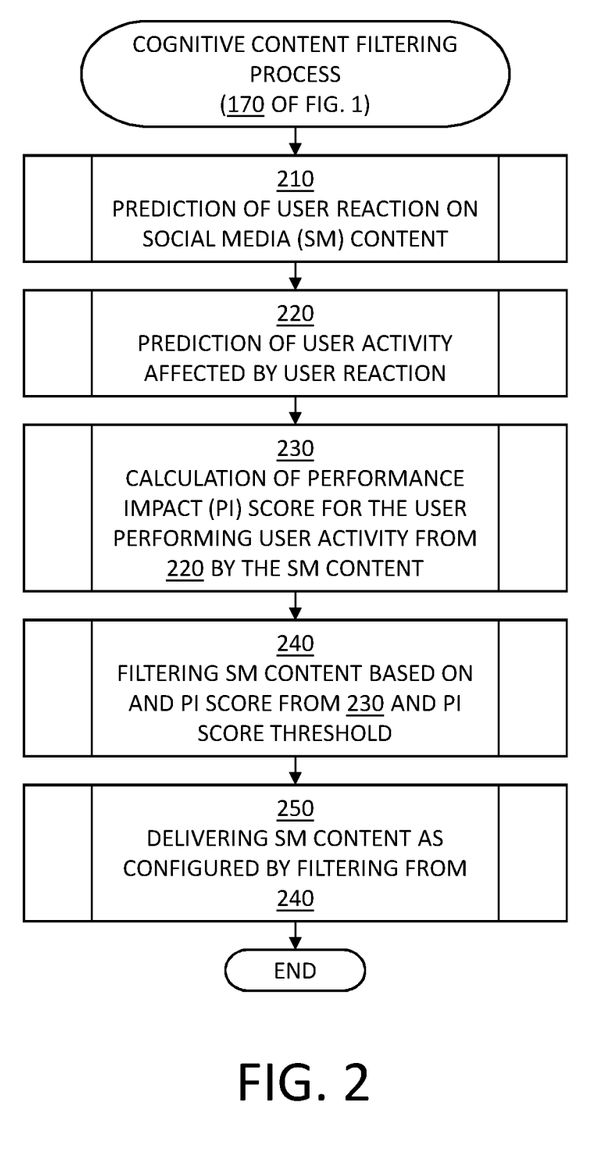
FIG. 2 depicts a flowchart of an overall process performed by the cognitive content filtering process, in accordance with one or more embodiments set forth herein.

FIG. 2 depicts a flowchart of an overall process performed by the cognitive content filtering process 170 of FIG. 1, in accordance with one or more embodiments set forth herein.

Prior to block 210, the reaction knowledgebase (RKB) 130 is established by past reactions corresponding to previous SM contents for the user 101. Also prior to block 210, the user activity severity configuration data 140 indicating how severely the user 101 may be affected by the SM content 107 while performing certain activities is set either automatically by the cognitive personal safeguard engine 120 and/or the machine learning service 181 or manually by the user 101. The cognitive content filtering process 170 of blocks 210 through 250 presented herein commences upon receiving the SM content 107 by the user device 110.

In block 210, the cognitive content filtering process 170 predicts a likely reaction indicating a most likely reaction that the SM content 107 would cause on the user 101. As noted, block 210 may be implemented as a separate predefined process of the reaction prediction process 150 in certain embodiments of the present invention. The cognitive content filtering process 170 analyzes the SM content 107 upon receiving and looks up the RKB 130 for the likely reaction by identifying a SM content stored in the RKB 130 that is most similar to the incoming SM content 107. The cognitive content filtering process 170 determines the likely reaction as a reaction corresponding to the SM content in the RKB 130 identified as the most similar to the incoming SM content 107. In certain embodiments of the present invention, the likely reaction is associated with a confidence score that quantifies probability of the likely reaction to occur as the user 101 receives the SM content 107, and one or more reaction having respective confidence scores greater than a threshold may be selected. Then the cognitive content filtering process 170 proceeds with block 220.

In block 220, the cognitive content filtering process 170 predicts a likely activity of the user 101 that is most likely to be affected by the SM content 107 if delivered without filtering. Similar to block 210, block 220 may also be implemented as a separate predefined process of the activity prediction process 160 in certain embodiments of the present invention. The cognitive content filtering process 170 determines the likely activity by analyzing routine activities of the user, calendar/events information, the duration of a present activity that the user 101 is performing, the duration/ sentiment/intensity of reaction on the SM content 107 as predicted from block 210, spoken/written words of the user 101, social media contribution/participation, etc., and by selecting an activity performed during a timeframe affected by the reaction predicted from block 210. For example, if the user 101 commented that he/she is going to do certain things at certain time, the likely activity may be inferred from the expressed activities and the cognitive content filtering process 170 compares the time of the activity with the duration of the predicted reaction. For another example, if the user 101 is presently driving to a known fishing destination on a day marked for "fishing with friends", the cognitive content filtering process 170 may predict that the user 101 would stop by at a bait shop after the driving, according to a customary course of actions. In certain embodiments of the present invention, the likely activity is associated with a confidence score that quantifies probability of the likely activity to happen or a level of confidence that the likely activity to be performed by the user 101 as affected by the SM content 107, and accordingly, one or more activity having respective confidence scores greater than a threshold may be selected. Then the cognitive content filtering process 170 proceeds with block 230.

In block 230, the cognitive content filtering process 170 calculates the performance impact (PI) score quantifying the effect of the SM content 107 on the user 101, as represented by the likely reaction from block 210, while performing the likely activity predicted from block 220. The PI score is a function of attributes of the likely reaction such as duration/ sentiment/intensity of the reaction, the likely activity, and the user activity severity corresponding to the likely activity. Block 230 may be implemented as a separate predefined process of the performance impact score calculation process 180 in certain embodiments of the present invention. In certain embodiments of the present invention, the PI score results from a sum of combined scores respectively proportional to the severity of the likely activity, duration of the likely reaction, intensity of the likely reaction, and negative sentiment of the likely reaction. Then the cognitive content filtering process 170 proceeds with block 240.

In block 240, the cognitive content filtering process 170 determines whether or not to filter the SM content based on the PI score from block 230 and a preset PI score threshold such that the performance of the user 101 would not be negatively impacted during the predicted likely activity and such that the safety of the user 101 would not be jeopardized. Then the cognitive content filtering process 170 proceeds with block 250. In certain embodiments, one or more PI score threshold may be set with respective delivery regimes corresponding to the PI score. Each delivery regime may include directives as to whether or not to delay the SM content before presenting the SM content to the user 101, whether or not to deliver the SM content at all regardless of a predetermined delay, the length of the predetermined delay for holding, and whether or not to inform the user 101 of the SM content with a notification, whether or not to reassess activity of the user 101 after the predetermined delay expires, etc. In one embodiment of the present invention, a PI score threshold may be set and the SM content 107 corresponding to a PI score greater than the PI score threshold may be delivered only when the user 101 is not performing any severe activity and/or at a certain safe location such as home. In another embodiment of the present invention, a PI score threshold for a delayed delivery and another PI score threshold for a notification may be set such that a time-sensitive SM content may be delivered as a notification for a more expedited delivery of the SM content than a regular delayed delivery. Time-sensitivity of the SM content may be determined by analyzing the SM content by use of the content analytics service 183. Accordingly, instead of delaying the SM content 107, the cognitive content filtering process 170 sends the notification that the SM content 107 has arrived. Upon receiving the notification, the user 101 may pause the severe activity and check the SM content 107, as in pulling over to a service area while driving on a highway.

In block 250, the cognitive content filtering process 170 completes delivery of the SM content 107 as configured in a delivery regime selected from block 240. Prior to delivering any delayed SM content 107, the cognitive content filtering process 170 may check the present location and activity of the user 101 for assurance. Then the cognitive content filtering process 170 concludes processing the SM content 107. Blocks 210 through 250 may be iterated as a unit for each incoming SM content. The likely reaction from block 210 and the likely activity from block 220 may be provided to the machine learning service 181 to improve accuracy of the prediction processes 150, 160 as well as accuracy of data stored in the RKB 130 and the user activity severity configuration data 140.

Figure 3:
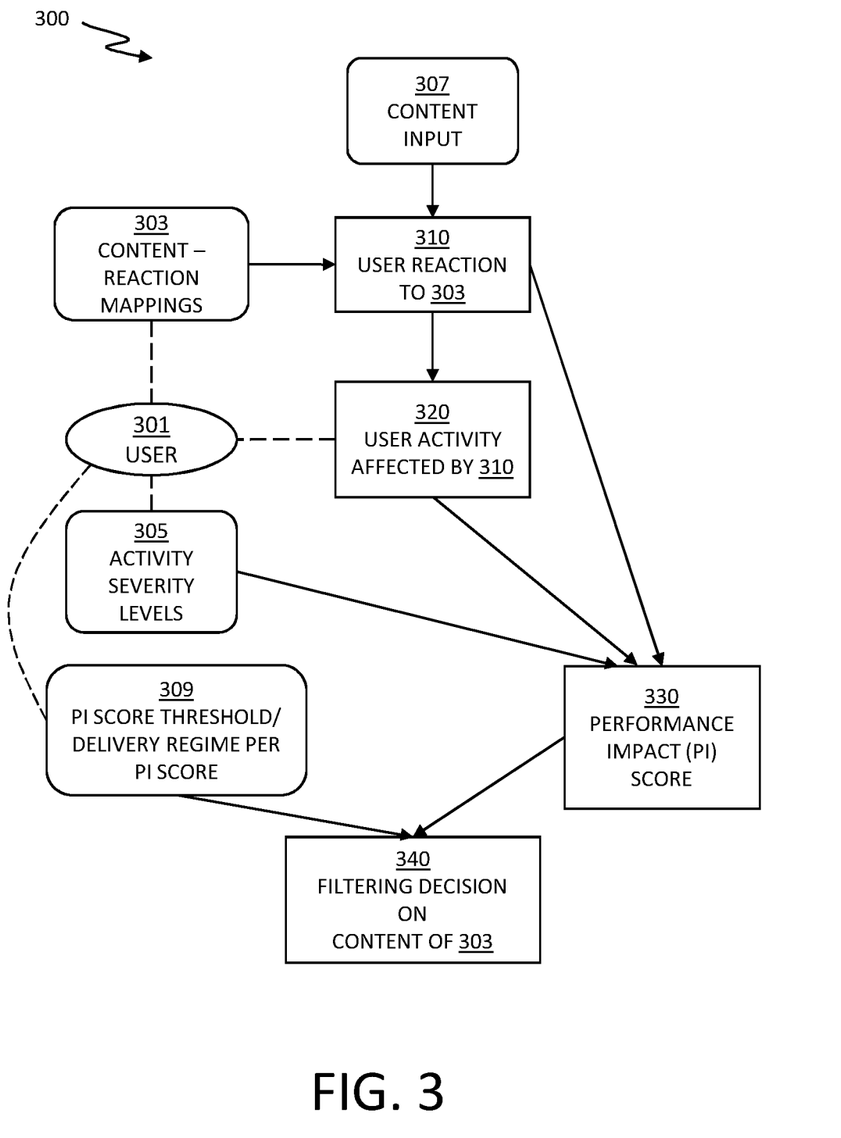
FIG. 3 depicts operational interdependencies of data elements presented in the system of FIG. 1, in accordance with one or more embodiments set forth herein.

FIG. 3 depicts an exemplary operational interdependencies of data elements 300 presented in the system 100 of FIG. 1, in accordance with one or more embodiments set forth herein.

A user 301 is associated with individual data utilized for the cognitive content filtering process 170 of FIG. 1, including content reaction mappings 303, activity severity levels 305, and performance impact (PI) score thresholds and delivery regimes 309, wherein the delivery regimes respectively correspond to each PI score threshold. In certain embodiments of the present invention, the content-reaction mapping 303 are stored in the reaction knowledgebase (RKB) 130 of FIG. 1, and the activity severity levels 305 are elements of the user activity severity configuration data 140. The PI score thresholds and delivery regimes 309 may be dynamically updated by the cognitive content filtering process 170, or manually configured by the user 301 with safety recommendations.

For example, the PI score thresholds and delivery regimes 309 may be set as a set of tuples {(80 or greater, Deliver content only when the user is performing Level 0 activity), (30-79, Deliver content when the user is performing Level 0 or Level 1 activity), (0-29, Deliver content anytime)}, wherein PI score may be in a range of zero (0) to one hundred (100), and Level 0 activity indicating a group of activities with minimal safety concerns, Level 1 activity indicating another group of activities with a medium range safety concerns, amongst three (3) activity severity levels, along with Level 2 activity indicating still another group of activities with a relatively high risk activities.

Prior to performing block 210 of FIG. 2, the cognitive content filtering process 170 receives content input 307. In performing block 210 of FIG. 2, the cognitive content filtering process 170 searches the content-reaction mapping 303 for a content similar to the content input 307, and if a matching content is found, then returns a reaction corresponding to the matching content as a user reaction 310 to the content input 303.

In performing block 220 of FIG. 2, the cognitive content filtering process 170 utilizes calendar events, daily routines, or other activity histories and profiles to predict a user activity 320 that would be affected by the user reaction 310, if the content input 307 is delivered to the user 301 without filtering.

In calculating a performance impact (PI) score 330, as in block 230 of FIG. 2, the cognitive content filtering process 170 classifies the predicted user activity 320 into one (1) level amongst the activity severity levels 305, in order to quantify how much safety concern would be posed by the predicted user activity 320. The cognitive content filtering process 170 then calculates the PI score 330 as a function of the predicted user reaction 310 and the selected activity severity level corresponding to the user activity 320.

In certain embodiments of the present invention, the cognitive content filtering process 170 calculates the PI score 330 as a weighted sum of the activity severity level and the user reaction 310. In the same embodiment, the cognitive content filtering process 170 may factor respective elements of the user reaction 310 such as an intensity, sentiment, and duration of the user reaction 310 in quantifying the user reaction 310.

In performing blocks 240 and 250 of FIG. 2, the cognitive content filtering process 170 makes a filtering decision 340 as to how to deliver the content input 307 based on the PI score 330 and the PI score threshold and delivery regime 309. In certain embodiments, a PI score threshold and a delay for the content input 307 corresponding to the PI score 330 over the PI score threshold may be specified, and accordingly, the cognitive content filtering process 170 would either hold the content input 307 for the delay or deliver the content input 307 without holding. In other embodiments of the present invention, as in the example shown above, the PI score thresholds may be presented in multiple ranges of PI scores and corresponding delivery regime.

Certain embodiments of the present invention may offer various technical computing advantages, including real-time content analytics, machine learning of patterns in reactions to social media contents, as well as cognitive predictions of user reactions to certain social media contents and user activity that may be affected by such content. A performance impact metric of a user is automatically calculated based on a cognitively predicted reaction to social media content, a cognitively predicted activity of which performance may be affected by the cognitively predicted reaction, and severity levels of activities that has been individually configured for the user. One or more threshold for the performance impact metric is preconfigured and corresponding filtering decisions and/or delivery regimes are respectively associated such that the social media content may be delivered in a manner that would not impair performance of the user and/or that would not present additional safety risk to the user. Certain embodiments of the present invention may be implemented as a subscribed service offered, proprietary to the social media delivery infrastructure, and/or as a user application running on user mobile devices. Certain embodiments of the present invention improves the accuracy of the predictions on reactions to social media contents and on activities likely to be affected by the reactions, by machine learning of the patterns in social media content and reactions over time and by content analysis of the social media content, user calendar schedules and events, daily routine of the user, social media activities including postings, comments, and followings.

Figure 4:
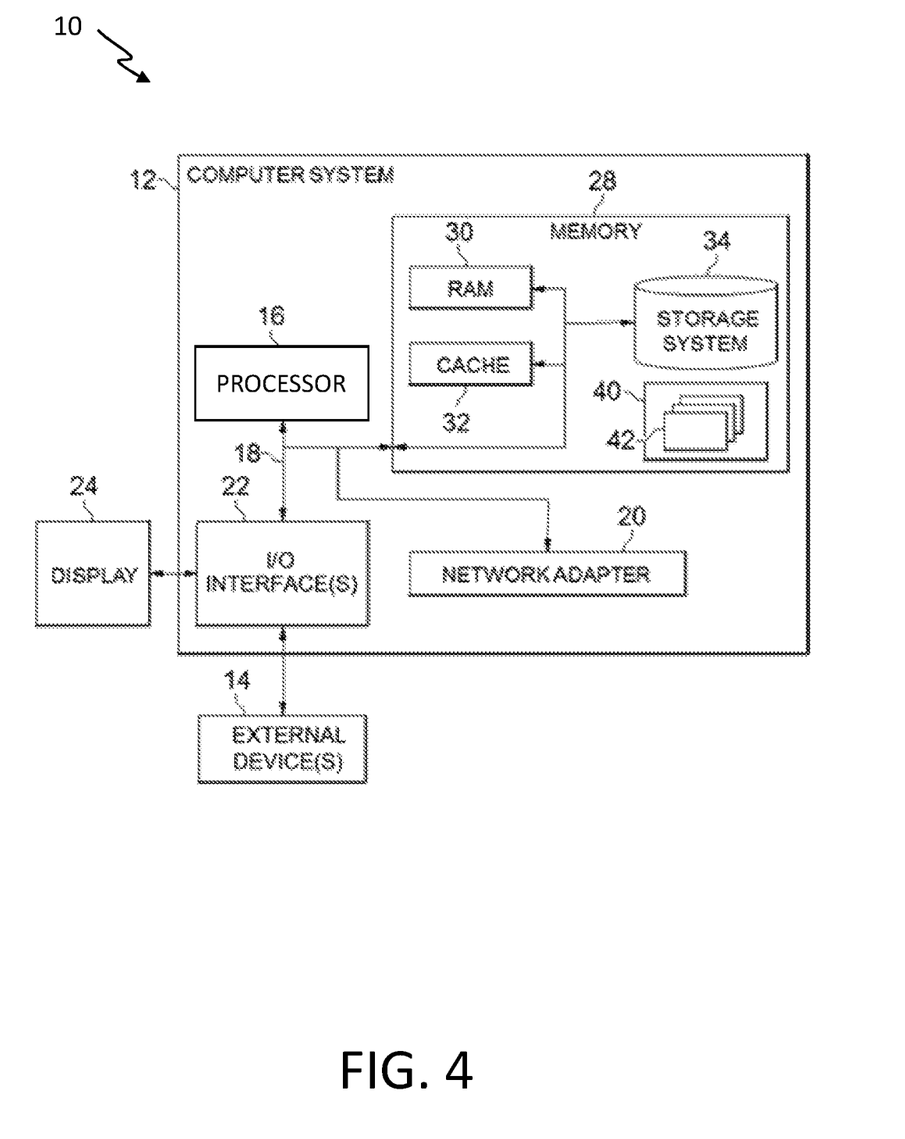
FIG. 4 depicts a cloud computing node according to an embodiment of the present invention.
Figure 5:
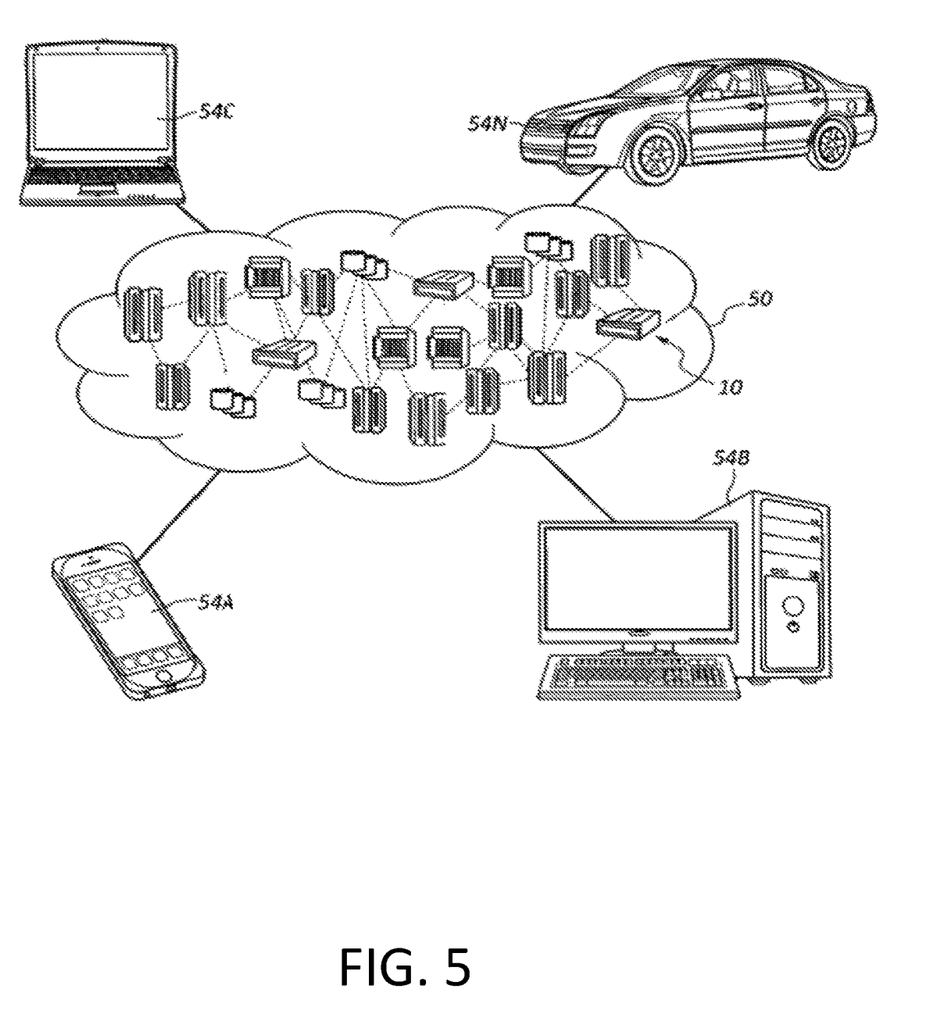
FIG. 5 depicts a cloud computing environment according to an embodiment of the present invention.
Figure 6:
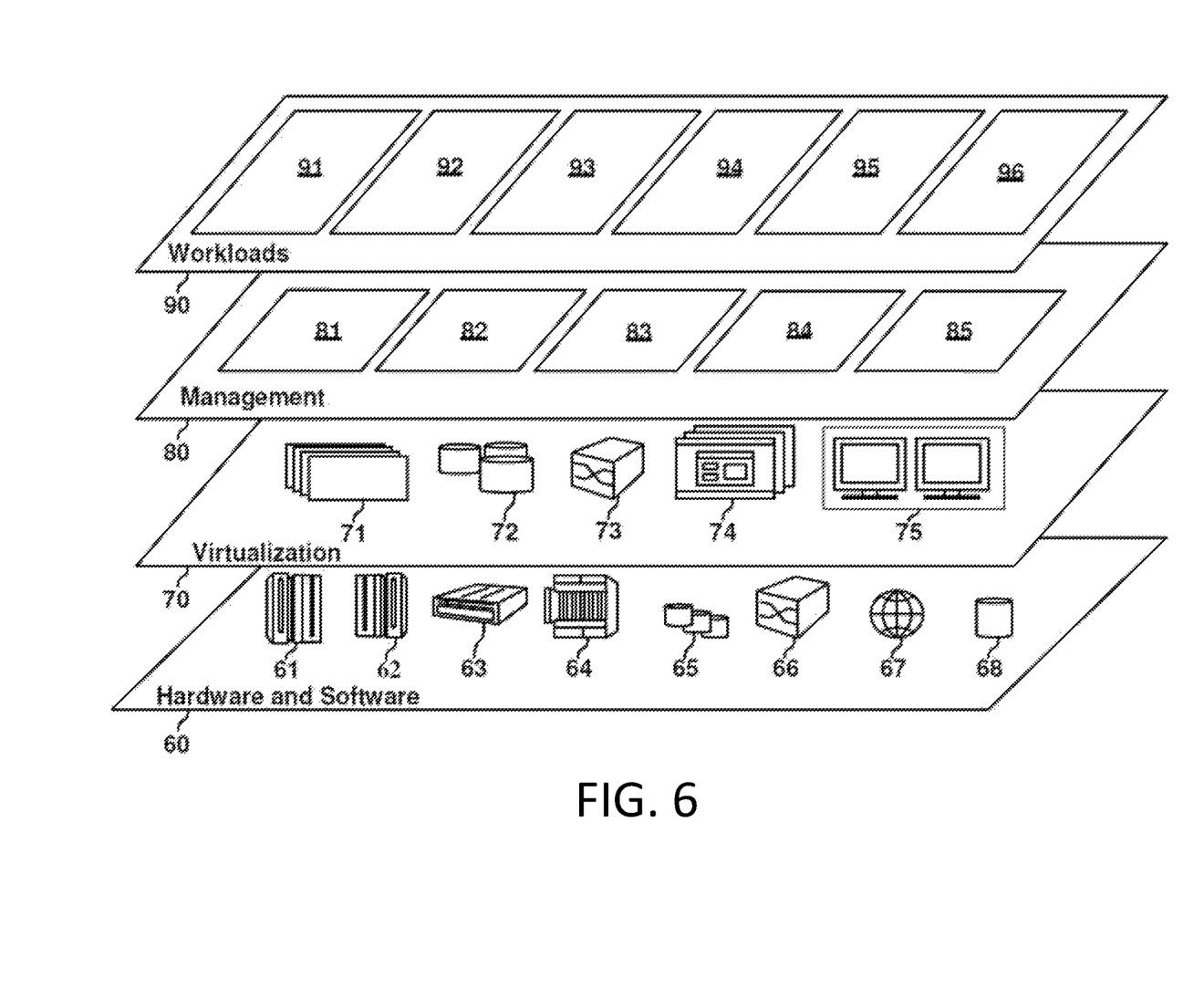
FIG. 6 depicts abstraction model layers according to an embodiment of the present invention.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive personal safeguard engine 120 of FIG. 1. Program processes 42, as in the cognitive content filtering process 170 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and processing components for the cognitive personal safeguard engine 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for cognitively filtering social media content to a user, comprising:
    predicting, by one or more processor, a reaction of the user that is likely to be caused by the social media content based on content-reaction mappings, wherein past reactions to types of past social media contents are classified by machine learning and content analytics and stored as respective content-reaction mappings in a reaction knowledgebase;
    predicting an activity of the user that the user is likely to perform while having the predicted reaction;
    calculating a performance impact score for the user, the performance impact score indicating a measure of impact by the social media content on the user performing the predicted activity;
    filtering the social media content, upon determining that the calculated performance impact score is within a range for the filtering; and
    delivering the social media content according to a delivery regime associated with the range, wherein the delivery regime includes directives on aspects of an actual delivery to the user including a delay until the actual delivery and a notification of the social media content, wherein the delivery regime corresponds to a combination of a threshold for the user on the performance impact score and a severity of the activity to the user.

2. The computer implemented method of claim 1, the predicting the reaction comprising:
    determining a pattern between the social media content and the reaction, wherein the pattern is established based on the past social media contents and corresponding reactions by the user;
    classifying the social media content as a group appearing from the past social media contents, wherein the past social media contents in the group have substance similar to the social media content; and
    selecting the reaction corresponding to the group as the reaction that is most likely to be caused by the social media content.

3. The computer implemented method of claim 1, the predicting the activity comprising:
    determining attributes of the predicted reaction, including a duration of the predicted reaction;
    analyzing data relevant to user activities, including a calendar of the user, past activities of the user, daily routines of the user, and a duration of a present activity of the user; and
    selecting the activity of the user that the user is likely to perform during the duration of the predicted reaction.

4. The computer implemented method of claim 1, the calculating comprising:
    determining the severity associated with the predicted activity, wherein the severity indicates a level of risk to the user if the user performs the activity while being negatively impacted on an ability of the user; and
    obtaining the performance impact score as a function of the determined severity, the activity, and attributes of the reaction, wherein the performance impact score increases respectively proportional to the severity of the activity, duration of the reaction, intensity of the reaction, and negative sentiment of the reaction.

5. The computer implemented method of claim 1, the filtering comprising:
    discovering the range corresponding to the calculated performance impact sore by comparing the performance impact score with one or more threshold set for the performance impact score, wherein the range for the filtering is separated by the one or more threshold, and wherein one or more range including the range is respectively associated with one or more delivery regime; and
    withholding the social media content for a period of time set in the delivery regime corresponding to the range, wherein the one or more delivery regime including the delivery regime directs whether or not to delay the social media content before presenting to the user, for how long to delay the social media content before presenting to the user, whether or not to deliver the social media content at all after a predetermined delay, a length of the predetermined delay, and whether or not to inform the user of the social media content with the notification.

6. The computer implemented method of claim 1, the delivering comprising:
    performing the directives set in the delivery regime subsequent to the filtering, wherein the directives are selected from presenting the social media content to the user after holding the social media content for a predetermined delay without informing the user, presenting the social media content to the user after holding the social media content for the predetermined delay after sending the notification, discarding the social media content immediately, and examining user activity after the predetermined delay.

7. The computer implemented method of claim 1, wherein the delivery regime corresponding to a low threshold amongst preconfigured ranges of the performance impact score the user on the performance impact score includes a directive to deliver the social media content at any time regardless of the severity of the activity from the predicting.

8. The computer implemented method of claim 1, wherein the delivery regime corresponding to the performance impact score greater than a medium threshold amongst preconfigured ranges of the performance impact score for the user includes a directive to deliver the social media content when the severity of the predicted activity is less than a preconfigured risk level.

9. The computer implemented method of claim 1, wherein the severity of the activity increases if safety concerns of the user while performing the activity is present or if the activity is of preconfigured personal significance to the user.

10. The computer implemented method of claim 1, wherein the combination of the threshold on the performance impact score and the severity of the activity is preconfigured individually for the user based on skill and experience of the user on the activity.

11. A computer program product comprising:
a computer readable storage medium readable by one or more processor and storing instructions for execution by the one or more processor for performing a method for cognitively filtering a social media content to a user, comprising:
predicting a reaction of the user that is likely to be caused by the social media content based on content-reaction mappings, wherein past reactions to types of past social media contents are classified by machine learning and content analytics and stored as respective content-reaction mappings in a reaction knowledgebase;
predicting an activity of the user that the user is likely to perform while having the predicted reaction;
calculating a performance impact score for the user, the performance impact score indicating a measure of impact by the social media content on the user performing the predicted activity;
filtering the social media content, upon determining that the calculated performance impact score is within a range for the filtering; and
delivering the social media content according to a delivery regime associated with the range, wherein the delivery regime includes directives on aspects of an actual delivery to the user including a delay until the actual delivery and a notification of the social media content, wherein the delivery regime corresponds to a combination of a threshold for the user on the performance impact score and a severity of the activity to the user.

12. The computer program product of claim 11, the predicting the reaction comprising:
determining a pattern between the social media content and the reaction, wherein the pattern is established based on the past social media contents and corresponding reactions by the user;
classifying the social media content as a group appearing from the past social media contents, wherein the past social media contents in the group have substance similar to the social media content; and
selecting the reaction corresponding to the group as the reaction that is most likely to be caused by the social media content.

13. The computer program product of claim 11, the predicting the activity comprising:
determining attributes of the predicted reaction, including a duration of the predicted reaction;
analyzing data relevant to user activities, including a calendar of the user, past activities of the user, daily routines of the user, and a duration of a present activity of the user; and
selecting the activity of the user that the user is likely to perform during the duration of the predicted reaction.

14. The computer program product of claim 11, the calculating comprising:
determining the severity associated with the predicted activity, wherein the severity indicates a level of risk to the user if the user performs the activity while being negatively impacted on an ability of the user; and
obtaining the performance impact score as a function of the determined severity, the activity, and attributes of the reaction, wherein the performance impact score increases respectively proportional to the severity of the activity, duration of the reaction, intensity of the reaction, and negative sentiment of the reaction.

15. The computer program product of claim 11, the filtering comprising:
discovering the range corresponding to the calculated performance impact sore by comparing the performance impact score with one or more threshold set for the performance impact score, wherein the range for the filtering is separated by the one or more threshold, and wherein one or more range including the range is respectively associated with one or more delivery regime; and
withholding the social media content for a period of time set in the delivery regime corresponding to the range, wherein the one or more delivery regime including the delivery regime directs whether or not to delay the social media content before presenting to the user, for how long to delay the social media content before presenting to the user, whether or not to deliver the social media content at all after a predetermined delay, a length of the predetermined delay, and whether or not to inform the user of the social media content with the notification.

16. The computer program product of claim 11, the delivering comprising:
performing the directives set in the delivery regime subsequent to the filtering, wherein the directives are selected from presenting the social media content to the user after holding the social media content for a predetermined delay without informing the user, presenting the social media content to the user after holding the social media content for the predetermined delay after sending the notification, discarding the social media content immediately, and examining user activity after the predetermined delay.

17. The computer program product of claim 11, wherein the past reactions to the past social media contents are classified by machine learning and content analytics and stored as respective content-reaction mappings in a reaction knowledgebase such that a pattern of the past reactions by the user is likely to be grouped according to the types of the past social media contents.

18. A system comprising:
a memory;
one or more processor in communication with memory; and
program instructions executable by the one or more processor via the memory to perform a method for cognitively filtering a social media content to a user, comprising:
predicting a reaction of the user that is likely to be caused by the social media content, comprising:
  determining a pattern between the social media content and the reaction, wherein the pattern is established based on past social media contents and corresponding reactions by the user;
  classifying the social media content as a group appearing from the past social media contents, wherein the past social media contents in the group have substance similar to the social media content; and
  selecting the reaction corresponding to the group as the reaction that is most likely to be caused by the social media content,
  wherein past reactions to the past social media contents are classified by machine learning and content analytics and stored as respective content-reaction mappings in a reaction knowledgebase;
predicting an activity of the user that the user is likely to perform while having the predicted reaction;
calculating a performance impact score for the user, the performance impact score indicating a measure of impact by the social media content on the user performing the predicted activity;
filtering the social media content, upon determining that the calculated performance impact score is within a range for the filtering; and
delivering the social media content according to a delivery regime associated with the range, comprising:
  performing directives set in the delivery regime subsequent to the filtering, wherein the directives are selected from presenting the social media content to the user after holding the social media content for a predetermined delay without informing the user, presenting the social media content to the user after holding the social media content for the predetermined delay after sending a notification, discarding the social media content immediately, and examining user activity after the predetermined delay.

19. The system of claim 18, the predicting the activity comprising:
determining attributes of the predicted reaction, including a duration of the predicted reaction;
analyzing data relevant to user activities, including a calendar of the user, past activities of the user, daily routines of the user, and a duration of a present activity of the user; and
selecting the activity of the user that the user is likely to perform during the duration of the predicted reaction.

20. The system of claim 18, the filtering comprising:
discovering the range corresponding to the calculated performance impact sore by comparing the performance impact score with one or more threshold set for the performance impact score, wherein the range for the filtering is separated by the one or more threshold, and wherein one or more range including the range is respectively associated with one or more delivery regime; and
withholding the social media content for a period of time set in the delivery regime corresponding to the range, wherein the one or more delivery regime including the delivery regime directs whether or not to delay the social media content before presenting to the user, for how long to delay the social media content before presenting to the user, whether or not to deliver the social media content at all after a predetermined delay, a length of the predetermined delay, and whether or not to inform the user of the social media content with the notification.

* * * * *